(12) United States Patent
Abernethy, Jr.

(10) Patent No.: US 10,100,948 B2
(45) Date of Patent: Oct. 16, 2018

(54) FAUCET INSULATION APPARATUS

(71) Applicant: Claremont Products, LLC, Claremont, NC (US)

(72) Inventor: Joseph M. Abernethy, Jr., Claremont, NC (US)

(73) Assignee: CLAREMONT PRODUCTS, LLC, Claremont, NC (US)

( * ) Notice: Subject to any disclaimer, the term of this patent is extended or adjusted under 35 U.S.C. 154(b) by 2 days.

(21) Appl. No.: 14/666,379

(22) Filed: Mar. 24, 2015

(65) Prior Publication Data

US 2015/0267832 A1    Sep. 24, 2015

Related U.S. Application Data

(60) Provisional application No. 61/969,313, filed on Mar. 24, 2014.

(51) Int. Cl.
F16K 49/00 (2006.01)
F16K 35/10 (2006.01)
E03B 7/12 (2006.01)

(52) U.S. Cl.
CPC ............. *F16K 49/00* (2013.01); *F16K 35/10* (2013.01); *E03B 7/12* (2013.01); *Y10T 137/7036* (2015.04)

(58) Field of Classification Search
CPC .......... F16K 27/12; F16K 35/10; F16K 49/00; Y10T 137/7036; Y10T 137/7043; Y10T 137/7042; Y10T 137/7047; Y10T 137/7054; Y10T 137/7062; E03B 7/12

USPC ........ 137/375, 377, 378, 380, 382; 206/592, 206/321, 320

See application file for complete search history.

(56) References Cited

U.S. PATENT DOCUMENTS

| 3,435,946 A | * | 4/1969 | Sobek | B65D 81/1075 206/523 |
| 3,556,158 A | * | 1/1971 | Schneider | F16K 27/12 137/375 |
| 3,858,632 A | * | 1/1975 | Stout | F16L 59/161 137/375 |
| 4,071,043 A | * | 1/1978 | Carlson | F16L 59/161 137/375 |
| 4,246,211 A | * | 1/1981 | Kuhnel | C08J 9/0061 264/140 |
| 4,353,139 A | * | 10/1982 | Wainwright | A47K 3/001 239/211 |
| 4,577,655 A | * | 3/1986 | Carroll | F16K 49/00 137/375 |
| 5,080,950 A | * | 1/1992 | Burke | B32B 5/24 428/157 |
| 5,148,920 A | * | 9/1992 | Walker | B65D 81/1075 206/438 |
| 5,589,519 A | * | 12/1996 | Knaus | C08J 9/04 264/50 |

(Continued)

*Primary Examiner* — Kevin Murphy
*Assistant Examiner* — Kelsey Cary
(74) *Attorney, Agent, or Firm* — Shumaker, Loop & Kendrick, LLP

(57) ABSTRACT

The invention is an insulated faucet cover for insulating a faucet. The insulated faucet cover has an insulative block and an internal cavity. The internal cavity has a single opening on a front side of the insulative block and is sized to fit over a faucet. The internal cavity has a plurality of internal surfaces which contact the faucet to firmly hold the insulated faucet cover in place over the faucet.

14 Claims, 7 Drawing Sheets

(56) References Cited

U.S. PATENT DOCUMENTS

| | | | | |
|---|---|---|---|---|
| 5,614,119 A | * | 3/1997 | Ollis | E03B 7/12 |
| | | | | 137/341 |
| 5,878,776 A | * | 3/1999 | Love | F16L 59/161 |
| | | | | 137/375 |
| D652,708 S | * | 1/2012 | Figureida | D8/343 |
| 8,511,335 B2 | * | 8/2013 | Murphy | F16L 59/161 |
| | | | | 137/294 |

* cited by examiner

FAUCET INSULATION APPARATUS

CROSS REFERENCE TO RELATED APPLICATIONS

This application is a non-provisional of, claims priority to and benefit of, and incorporates by reference the entirety of U.S. Provisional Patent Application having Ser. No. 61/969,313 filed on Mar. 24, 2014.

TECHNICAL FIELD AND BACKGROUND OF INVENTION

The invention relates to the field of insulation materials. More particularly, the invention relates to the field of insulation used to protect faucets and other exposed fluid carrying devices.

In the industrialized world, fluids comprise an important part of various systems including residential, agricultural, mining, commercial, and industrial buildings and fixtures as well as equipment, mobile structures, and transportation devices. Fluids such as water, petroleum, and natural gas are typically carried and transported in such systems through conduits such as pipe.

It is common for such systems to be utilized in environments where environmental temperatures are incongruous with the proper function of the fluids. For instance, a residential house may have piping such as steel, copper, brass, PVC, PEX, or other plastics installed in the walls and other concealed places in the home. In such a residential installation, it is common for the piping to exit the residential structure at an external faucet, hose bib, or other valve connection(s) so that running water may be provided to the exterior of the home. Accordingly, depending on location, it is common for the temperatures outside of the home to fall below a freezing point for the fluid such that the fluid in the pipes may be subject to freezing.

Though the systems, such as housing, often provide insulation for the fluids and conduit located within the structure, it is common for the external connection valves to be uninsulated. Thus, the fluid contained in the external faucets and valve connections are subject to freezing. Such freezing can make the faucet valve connection inoperable at low temperatures. Similarly, freezing of water and other fluids which expand at low temperatures can even cause the conduit and faucet to break due to the increased pressure exerted by the fluid on the conduit.

For many years, the solution to this problem has been to wrap the external conduit and valves with insulative fabric. Cotton, wool, asbestos, and other materials have been wrapped in layers around the conduit and valves to provide a layer of insulation. Though somewhat effective in preventing freezing, the wrapping creates a barrier to ready use of the faucets as a person must unwrap the faucet for a desired use. Similarly, after use, the faucet must be wrapped once again. This process is time consuming. Additionally, the wrapping itself may be subject to freezing if saturated with water and many of the materials, such as asbestos, have other well documented hazards.

In response to the problems associated with common faucet wrapping techniques, those of skill in the art have attempted various improvements. These improvements include devices which have a hook attached to a covering. A user must attach the hook to the faucet, place a covering loosely around the faucet, and then manually tighten a screw or other implement which places the covering in tension with the hook to cover the faucet. In such systems, the integrity of the system is completely dependent on the attachment of the hook. If the hook fails, as is often the case, the cover falls from the faucet and the faucet is exposed to the environment. Similarly, if the hook does not fit a particular style faucet the covering will provide no insulation or only minimal to the faucet.

Further, in such prior art systems, it takes significant time and dexterity to attach the hook and tighten the covering around the faucet. Thus, much like the earlier wrapping techniques, significant time is required to apply the coverings of the current state of the art and such covering remain prone to failure.

Thus, there exists a need in the art for an insulated faucet covering that is quick and easy to install and that is not likely to fail during cold weather. There is a need in the art for a faucet covering that fits many different faucet styles. There is also a need in the art for a covering that is inexpensive and easy to manufacture and is non-toxic.

SUMMARY OF THE INVENTION

The present invention is thus an insulated faucet cover which provides thermal insulation to a faucet connected to conduit carrying fluids. The insulated faucet cover of the present invention is designed to provide thermal insulation to a faucet in order to insulate the faucet from environmental temperatures which may be adverse to the fluid carried in the faucet and attached conduit. As such, the faucet cover may prevent the fluid from freezing. The insulated faucet cover of the present invention is designed to accommodate many different styles of faucets in a single design.

The insulated faucet cover of the present invention does not require any "wrapping" as with the old art or any separate connections or fasteners such as the "hook" required by the prior art. As such, the insulated faucet cover of the present invention may be placed over the faucet and held in place by forces of the cover against the faucet. Thus, the insulated faucet cover of the present invention may be quickly, easily, and efficiently installed and removed.

The invention includes an insulative block having an internal cavity and provides insulation to a valve which is connected to a fluid conduit. The internal cavity has internal surfaces which are compatible with surfaces of the valve. The insulative block has a flat front surface which, when installed over a valve, is parallel to the wall of a building or other system from which the valve extends. When installed, the flat front surface will be in contact with the wall of the building. The internal cavity has a single opening on the flat front surface. The single opening may be roughly equal in size, or smaller than, the furthest extent of any portion of the valve as the valve passes through the plane of the front surface when the cover is installed.

The internal cavity is defined by the internal surfaces and also by the single opening. In one embodiment, the single opening extends in a single uniform direction into the block. These internal surfaces are in contact with the valve at various points such as at the extents of the valve and the friction between the internal surfaces and the valve maintains the cover in place over the valve.

According to one embodiment of the invention, for valves common in the art of water faucets and hose bibs as typically installed on building structures, the internal cavity may include a T-shape. The T-shape of the internal cavity may extend from the front surface of the block into the block. Alternatively, a modified T-shape or Y-shape may be utilized.

According to another embodiment of the invention, the faucet cover is made of foam. In such an embodiment, in addition to the friction force, the cover may also be held in place by elastic properties of the foam which constrict over the faucet.

According to another embodiment of the invention, the foam of the faucet cover is polyethylene foam. Such foam may have a density of 1.7 lbs per cubic foot. The 1.7 lb density foam may be charcoal gray, may be reprocessed, or regrind foam and may be cut from a larger plank. Such foam may be generally cheaper.

According to another embodiment of the invention, the foam of the faucet cover is a closed cell foam.

According to another embodiment of the invention, the foam of the faucet cover is an open cell foam.

According to another embodiment of the invention, the foam of the faucet cover may be selected from the group consisting of polyethylene foam, polyurethane foam, expanded polystyrene foam etc . . . .

According to another embodiment of the invention, the foam may have different colors and different densities. For example, the foam may be mint green in color and have a density of 1.2 lbs per cubic foot. Or, the foam may be white and have a density of 1.4 lbs per cubic foot. Alternatively, the foam density may vary from about 1.0 lb to as high as 6 or 8 lbs per cubic foot.

According to another embodiment of the invention, the block may be a cube that is 4 inches by 4 inches by 4 inches. In such an embodiment, the internal cavity, such as a T-shape, would extend from the front surface to a point 3 inches deep.

According to another embodiment of the invention, the block may be a cube that is 4 inches by 4 inches by 4 inches. In such an embodiment, the internal cavity, such as a Y-shape, would extend from the front surface to a point 3.5 inches deep.

According to another embodiment of the invention, the internal cavity has a plurality of surfaces extending from the opening on the front side such that the plurality of surfaces contact a plurality of surfaces of the faucet when installed to hold the cover in place around the faucet.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 1:
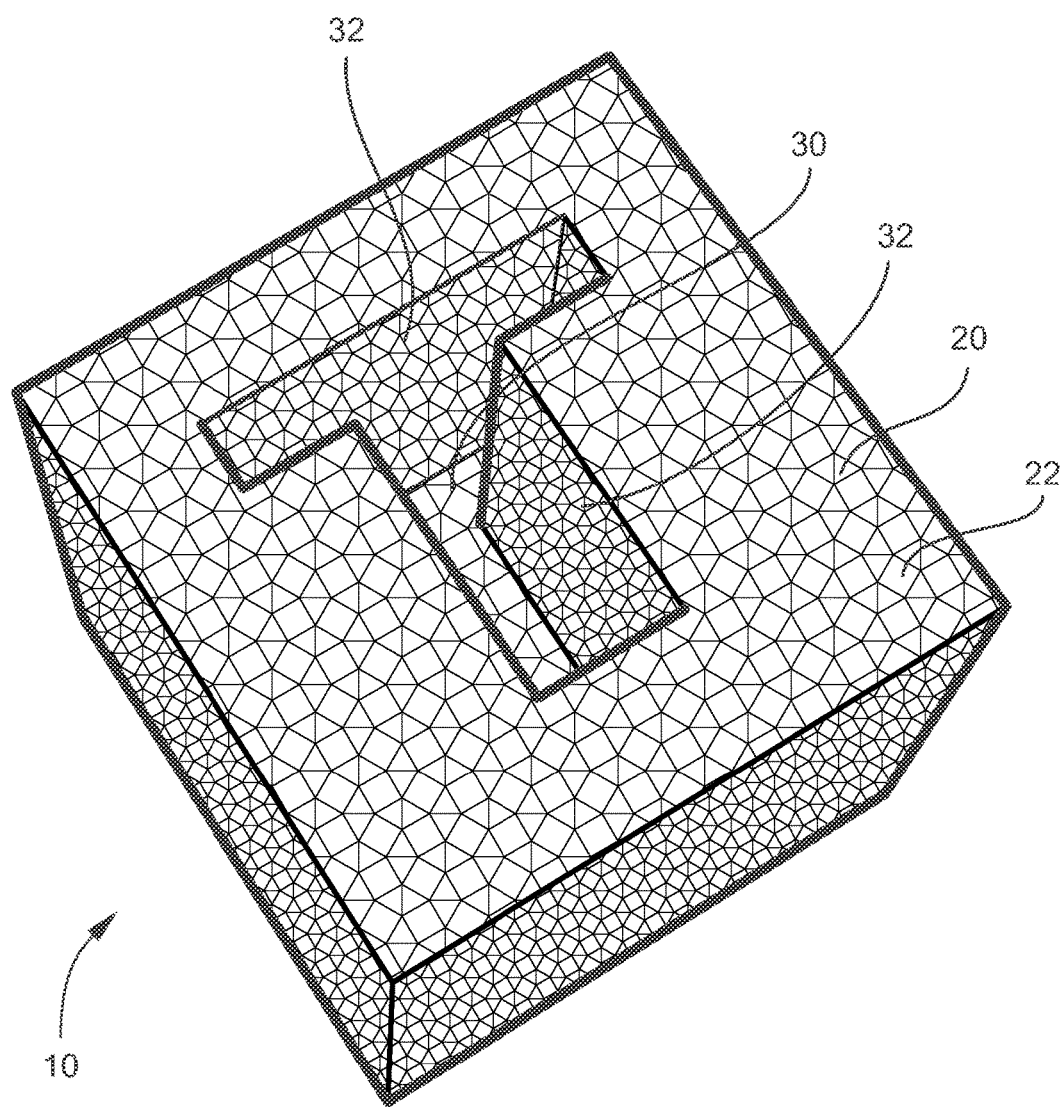
FIG. 1 is a perspective view of the insulated faucet cover.
Figure 11:
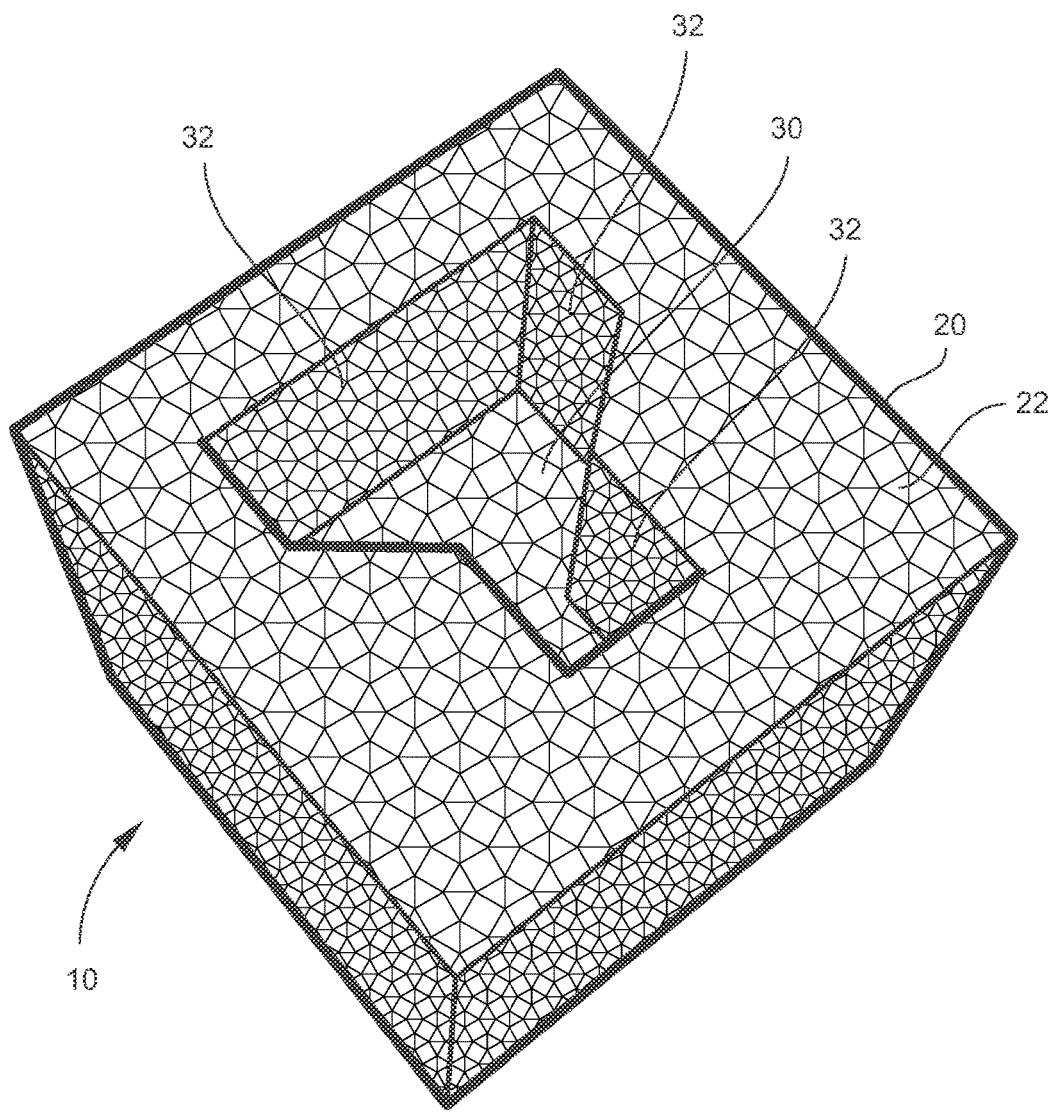
FIG. 11 is a perspective view of the insulated faucet cover showing a Y-shape cavity.

Referring now specifically to the drawings, FIG. 1 shows the insulated faucet cover 10 of the present invention. The faucet cover 10 includes an insulative block 20 made from a polyethylene foam. The polyethylene foam has a density of about 1.7 lbs. and is cube of about 4 inches in each direction. The faucet cover 10 includes a flat front surface 22. The faucet cover 10 includes an internal cavity 30 extending from a single opening on the flat front surface 22 into the block 20 by a distance of about 3 inches. Alternatively, the internal cavity may extent 3.5 inches in order to accommodate a faucet which protrudes further. The internal cavity 30 includes a plurality of surfaces 32. The internal cavity 30 has a generally T-shape as shown in FIG. 1 or a modified Y-shape as shown in FIG. 11. Further, though the preferred embodiment contemplates that the insulative block 20 is a cube, the invention expressly contemplates that the insulative block 20 may include a variety of shapes including rectangular, semispherical, and the like with the common element to the external shape being the flat front surface 22. Likewise, various internal cavities, in addition to preferred the T-shape of FIG. 1 and the modified Y-shape of FIG. 11, are contemplated with the common element being force of friction and the elastic force of the foam of the plurality of surfaces against the faucet.

Figure 2A:
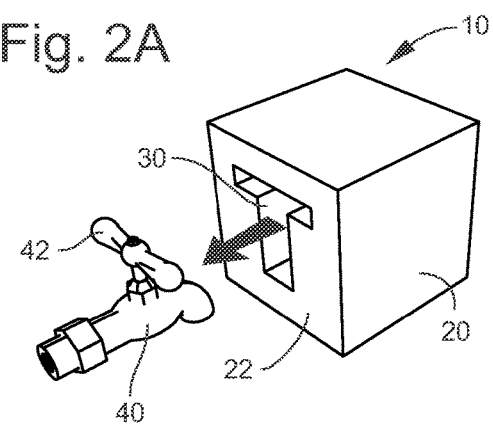
FIG. 2A is a perspective view of the insulated faucet cover in preparation of being installed over a faucet.
Figure 2B:
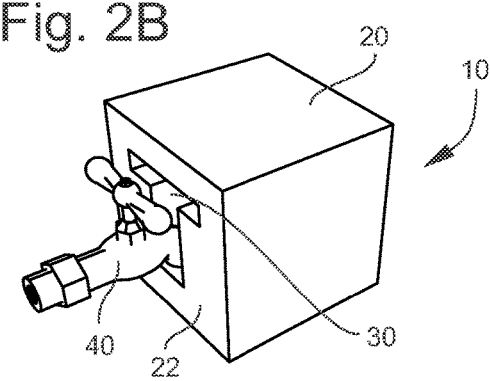
FIG. 2B is a perspective view of the insulated faucet cover being installed over a faucet.
Figure 2C:
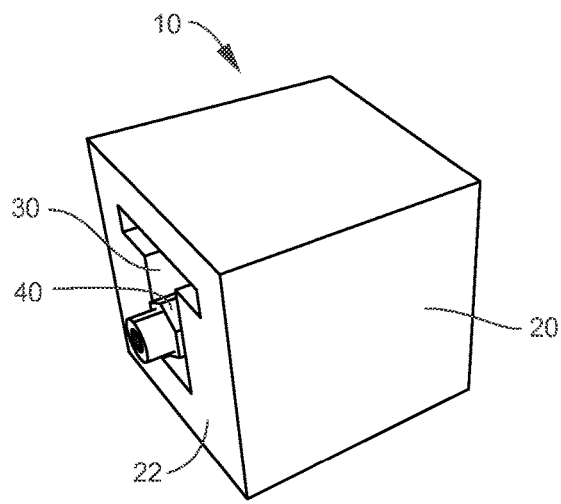
FIG. 2C is a perspective view of the insulated faucet cover installed over a faucet.
Figure 2D:
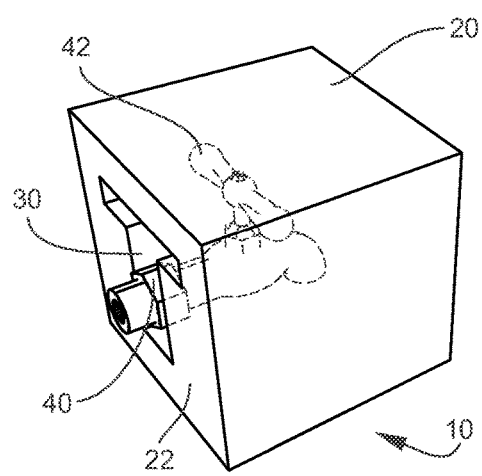
FIG. 2D is a perspective view of the insulated faucet cover installed over a faucet and highlighting the faucet inside the cover.

Referring to FIGS. 2A-2D, the insulated faucet cover 10 is shown being installed over a faucet 40. In FIG. 2A, the insulative block 20 is positioned in front of the faucet 40 in preparation of installation. In FIG. 2B, the insulative block 20 has been partially positioned over the faucet 40 such that the faucet 40 is partially inside the internal cavity 30. In FIG. 2B, it can be seen how the single opening of the internal cavity 30 is sized to be roughly equal in size, or smaller than, the furthest extent of any portion of the faucet 40 as the faucet passes through the plane of the front surface 22 when the faucet cover 10 is installed. In this view, it can be seen that the handle portion 42 of the faucet 40 is compatible with the T-shaped opening of the internal cavity 30 on the front surface 22 of the insulative block 20. In FIG. 2C the insulative block 20 is positioned over the faucet 40 such that the faucet 40 is fully inside the block 20 occupying the internal cavity 30. Similarly, FIG. 2D highlights the faucet 40 inside the block 20.

Figure 3:
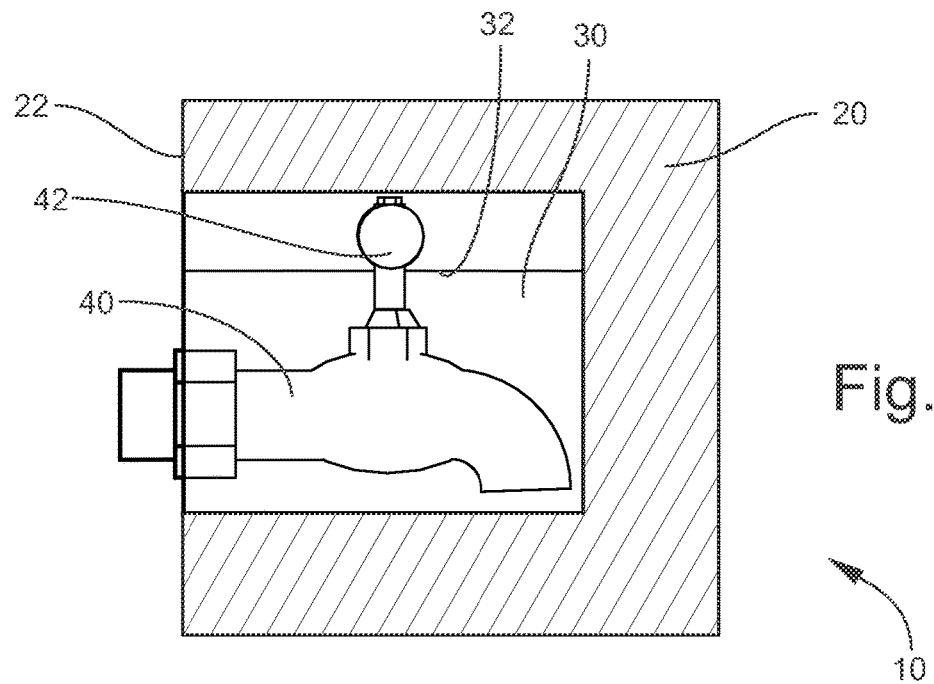
FIG. 3 is a side cutaway view of the insulated faucet cover installed over a faucet.
Figure 4:
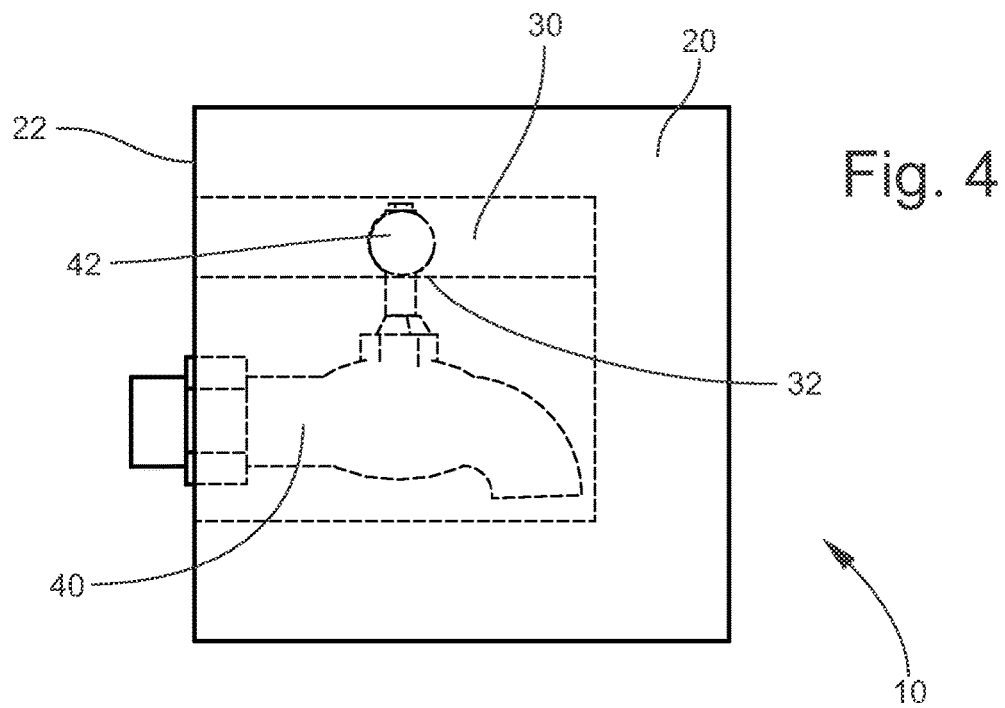
FIG. 4 is a side view of the insulated faucet cover installed over a faucet and highlighting the faucet inside the cover.

FIG. 3 and FIG. 4 show the block 20 installed over the faucet 40. In these figures, it can be seen how the faucet 40 is fully encompassed within the faucet cover 10. Likewise, the handle portion 42 of the faucet 40 is in contact with the surfaces 32 of the internal cavity 30 to secure the block 20 to the faucet 40.

Figure 5:
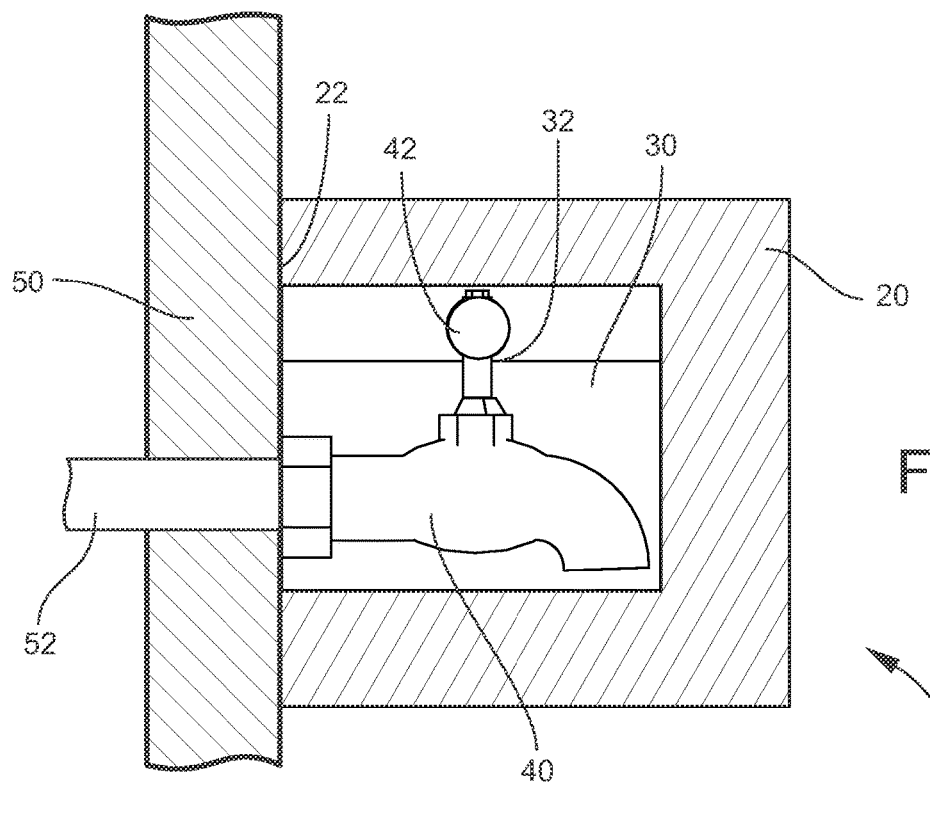
FIG. 5 is a side cutaway view of the insulated faucet cover installed over a first type of faucet which is connected to a wall and a conduit.
Figure 6:
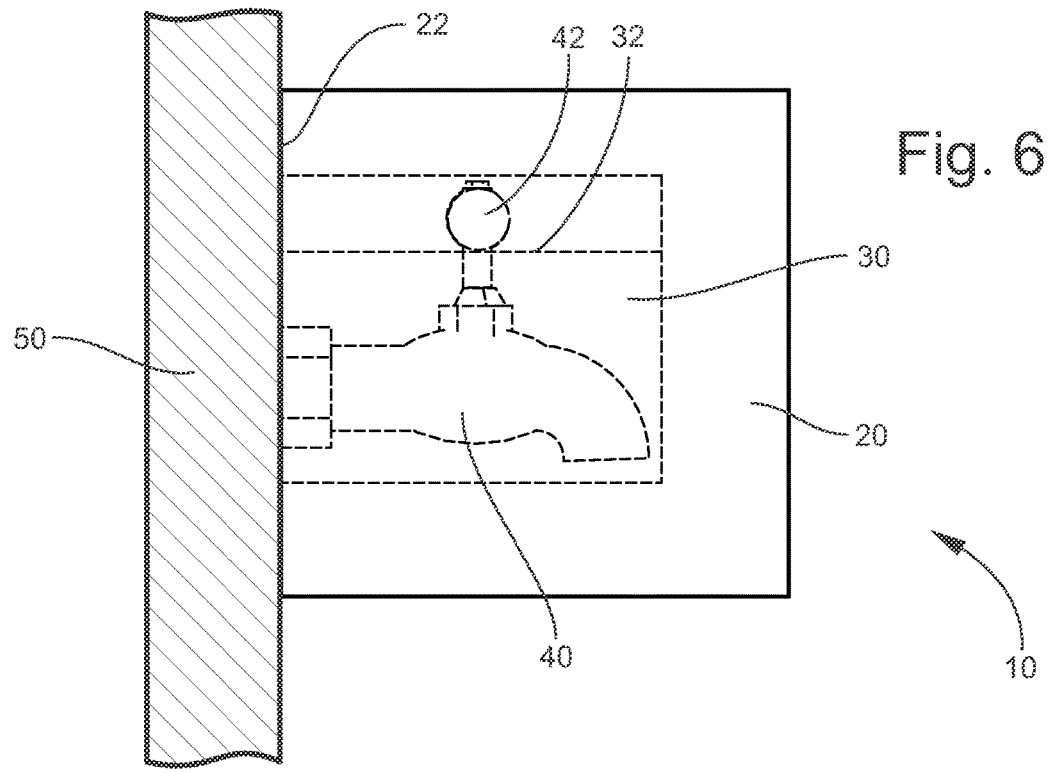
FIG. 6 is a side view of the insulated faucet cover installed over a first type of faucet which is connected to a wall and a conduit and highlighting the faucet inside the cover.

FIG. 5 and FIG. 6 show the block 20 installed over faucet 40 and in contact with wall 50. Conduit 52 extends through wall 50 into the internal of a building or other such system. In these figures, it can be seen how the faucet 40 is fully encompassed within the faucet cover 10. Likewise, the handle portion 42 of the faucet 40 is in contact with the surfaces 32 of the internal cavity 30 to secure the block 20 to the faucet 40.

Figure 7:
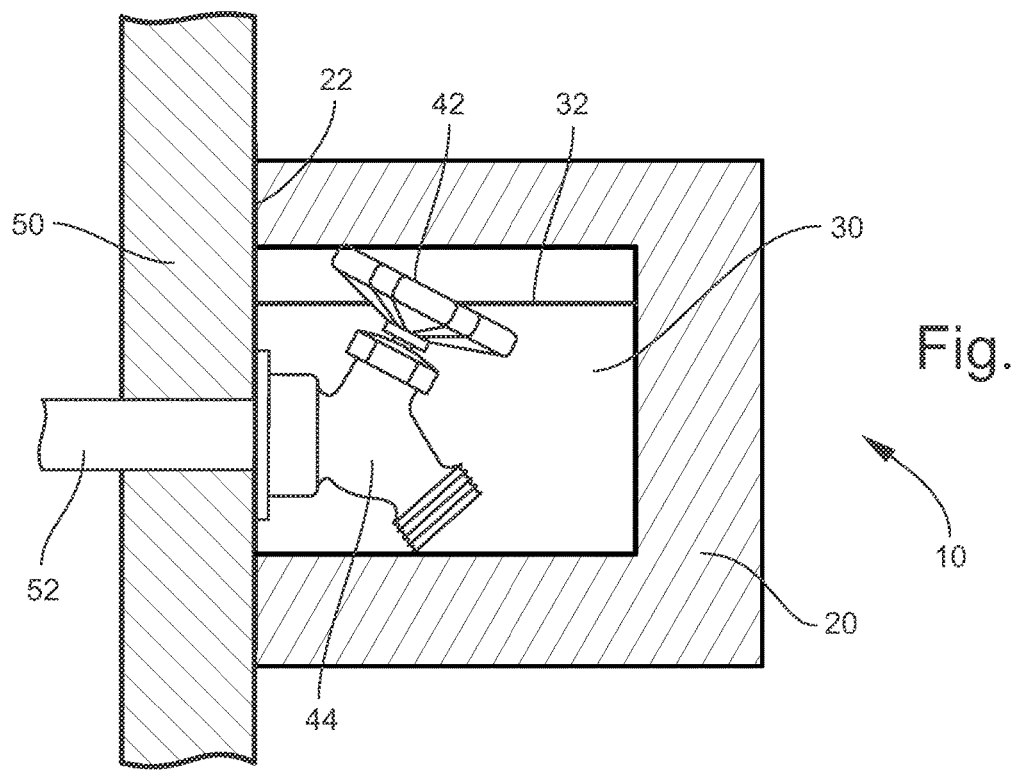
FIG. 7 is a side cutaway view of the insulated faucet cover installed over a second type of faucet which is connected to a wall and a conduit.
Figure 8:
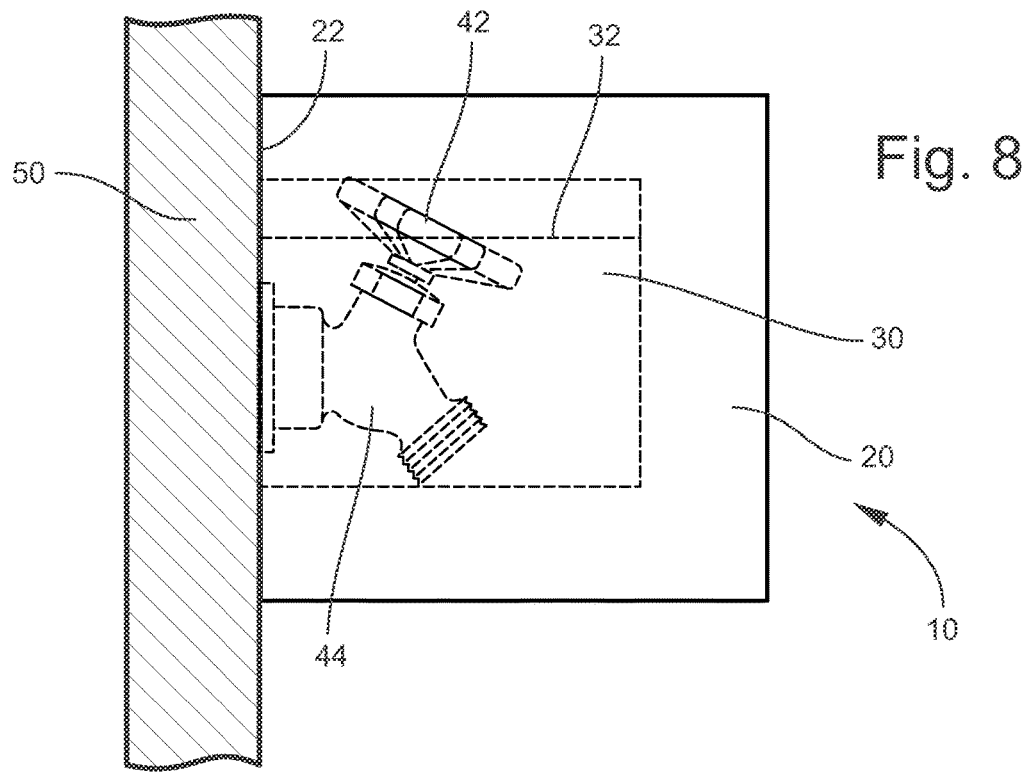
FIG. 8 is a side view of the insulated faucet cover installed over a second type of faucet which is connected to a wall and a conduit and highlighting the faucet inside the cover.
Figure 9:
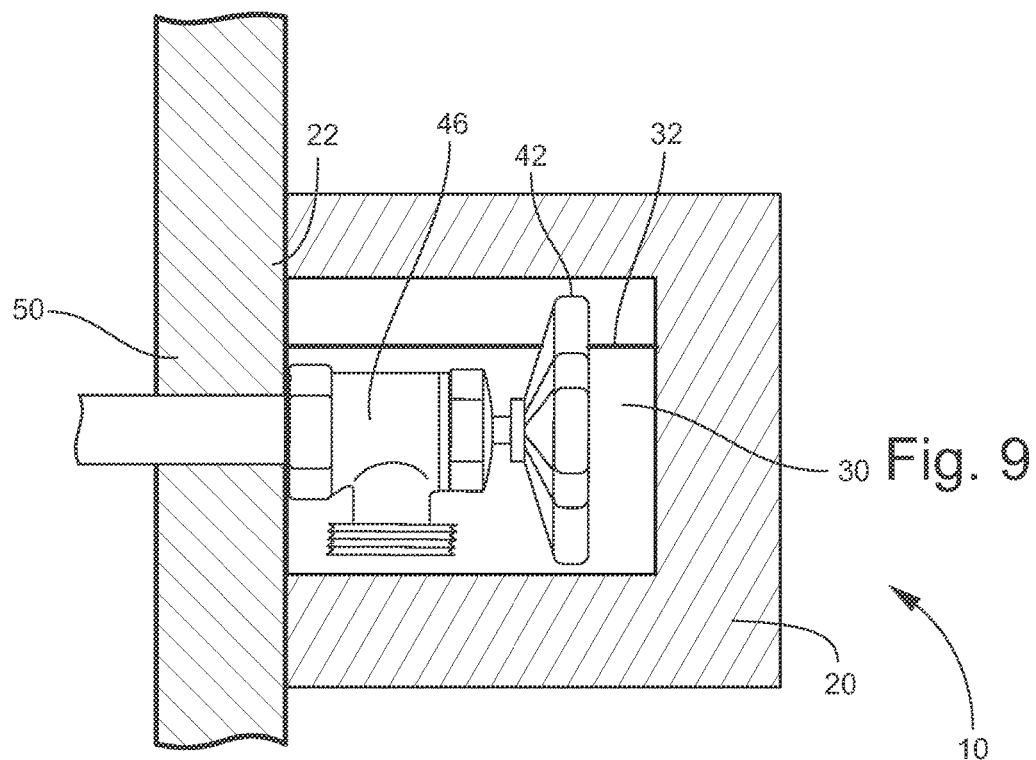
FIG. 9 is a side cutaway view of the insulated faucet cover installed over a third type of faucet which is connected to a wall and a conduit.
Figure 10:
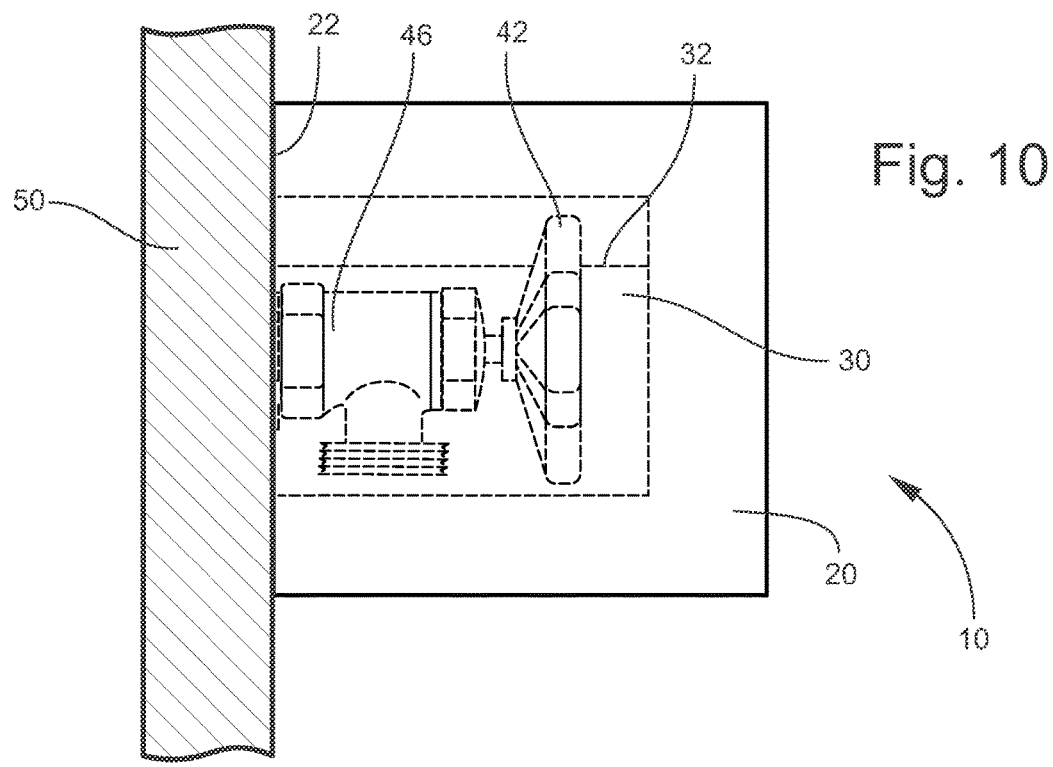
FIG. 10 is a side view of the insulated faucet cover installed over a third type of faucet which is connected to a wall and a conduit and highlighting the faucet inside the cover.

FIG. 7 and FIG. 8 show the same installation of the same faucet cover 10 as FIG. 5 and FIG. 6 except installed over a different style faucet 44. Similarly, FIG. 9 and FIG. 10 show the same installation of the same faucet cover 10 as FIG. 5 and FIG. 6 except installed over a different stall faucet 46.

An insulated faucet cover 10 has been described above. Various details of the invention may be changed without departing from the scope of the invention. Furthermore, the foregoing description of the preferred embodiment of the invention and best mode for practicing the invention are provided for the purpose of illustration only and not for the purpose of limitation.

What is claimed is:

1. An insulated faucet cover for insulating a faucet comprising:
    an insulative block, covering and thermally insulating a faucet, having an internal cavity defined by a plurality of internal surfaces and at least six external surfaces wherein only one of the external surfaces is a flat surface consisting of a single opening corresponding in shape to a cross-section of the internal cavity;
    wherein the plurality of internal surfaces correspond with a plurality of furthest extents of the faucet such that the plurality of internal surfaces are in contact with the furthest extents when the faucet cover is mounted to the faucet and such that the internal cavity maintains a substantially same shape when the faucet cover is not mounted to the faucet;
    wherein a friction force between the furthest extents of the faucet and the plurality of internal surfaces and an elastic force of the plurality of internal surfaces firmly holds the insulative block in place around the faucet;
    wherein the insulative block consists essentially of a single piece of foam; and
    wherein the single opening maintains and consists of a modified Y-shape when the faucet cover is mounted to the faucet and when it is not mounted to the faucet.

2. The insulated cover of claim 1 wherein the single piece of foam of the faucet cover is a closed cell foam.

3. The insulated cover of claim 1 wherein the single piece of foam of the faucet cover is an open cell foam.

4. The insulated cover of claim 1 wherein the single piece of foam of the faucet cover is selected from a group consisting of polyethylene foam, polyurethane foam, and expanded polystyrene foam.

5. The insulated faucet cover of claim 1 wherein the single piece of foam of the insulative block is made from a polyethylene foam having elastic properties which define the elastic force.

6. The insulated faucet cover of claim 5 wherein the insulative block is characterized by a lack of adhesive, hooks, tethers, or screws to secure the insulative block around the faucet other than the friction force and the elastic force.

7. The insulated cover of claim 6 wherein the polyethylene foam has a density of 1.7 lbs per cubic foot.

8. The insulated cover of claim 6 wherein the polyethylene foam is reprocessed foam or is regrind foam.

9. The insulated cover of claim 6 wherein the polyethylene foam has a density within the range of 1.0 lbs to 8.0 lbs per cubic foot.

10. The insulated cover of claim 6 wherein the insulative block has a cube shape.

11. The insulated cover of claim 10 wherein the cube shape has dimension of 4 inches by 4 inches by 4 inches and the internal cavity extends from the front surface to a point 3 inches deep.

12. The insulated cover of claim 10 wherein the cube shape has dimension of 4 inches by 4 inches by 4 inches and the internal cavity extends from the front surface to a point 3.5 inches deep.

13. An insulated faucet cover for insulating a faucet comprising:
    an insulative block, covering and thermally insulating a faucet, made from an elastic foam having a density in the range of 1.0 lbs to 8.0 lbs per cubic foot, and having an internal cavity and at least six external surfaces wherein only one of the external surfaces is a flat surface consisting of a single opening corresponding in shape to a cross-section of the internal cavity;
    a plurality of internal surfaces defining the internal cavity and corresponding with a plurality of furthest extents of the faucet wherein the plurality of internal surfaces are in contact with the furthest extents of the faucet when the faucet cover is mounted to the faucet;
    wherein a friction force between the furthest extents of the faucet and the plurality of internal surfaces and an elastic force of the plurality of internal surfaces firmly holds the insulative block in place around the faucet;
    wherein the insulative block is characterized by a lack of adhesive, hooks, tethers, or screwsto secure the insulative block around the faucet other than the friction force and the elastic force;
    wherein the insulative block consists essentially of a single piece of foam; and
    wherein the single opening maintains and consists of a modified Y-shape when the faucet cover is mounted to the faucet and when it is not mounted to the faucet.

14. The insulated faucet cover of claim 13 wherein the single piece of foam of the insulative block is made from a polyethylene foam having elastic properties which define the elastic force.

* * * * *